US012673739B2

(12) United States Patent
Kawagishi

(10) Patent No.: US 12,673,739 B2
(45) Date of Patent: Jul. 7, 2026

(54) SIDE COVER STRUCTURE

(71) Applicant: SUZUKI MOTOR CORPORATION, Hamamatsu (JP)

(72) Inventor: Masayuki Kawagishi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 378 days.

(21) Appl. No.: 18/351,776

(22) Filed: Jul. 13, 2023

(65) Prior Publication Data

US 2024/0083537 A1 Mar. 14, 2024

(30) Foreign Application Priority Data

Sep. 9, 2022 (JP) ................................. 2022-143828

(51) Int. Cl.
*B62J 23/00* (2006.01)
*B62J 40/10* (2020.01)

(52) U.S. Cl.
CPC ............... *B62J 23/00* (2013.01); *B62J 40/10* (2020.02)

(58) Field of Classification Search
CPC ... B62J 23/00; B62J 40/10; B62J 40/00; B62J 11/19; B62J 17/00; B62J 1/12; F02M 35/162; B62K 11/04; B62K 19/06
See application file for complete search history.

(56) References Cited

U.S. PATENT DOCUMENTS

| 10,668,979 B2 | 6/2020 | Okada et al. | ............ B62M 7/02 |
| 10,793,213 B2 * | 10/2020 | Mayuzumi | ................ B62J 1/08 |

| 2012/0242122 A1 * | 9/2012 | Kawatani | ................... B62J 1/18 |
| | | | 297/214 |
| 2015/0197297 A1 * | 7/2015 | Maeda | ..................... B62H 5/00 |
| | | | 70/158 |
| 2019/0084635 A1 * | 3/2019 | Mayuzumi | ............. B62K 19/46 |
| 2020/0094901 A1 | 3/2020 | Yoshiura | ................. B62J 17/02 |

FOREIGN PATENT DOCUMENTS

| JP | H 05-092783 A | 4/1993 |
| JP | 07137677 A | 5/1995 |
| JP | 3685897 B2 | 8/2005 |
| JP | 2007-045346 A | 2/2007 |
| JP | 2007-176370 A | 7/2007 |
| JP | 2017-007646 A | 1/2017 |
| JP | 2020-045055 A | 3/2020 |

OTHER PUBLICATIONS

Extended European Search Report mailed Jan. 23, 2024, issued to European Application No. 23185718.6.
Notice of Reasons for Refusal dated Jan. 27, 2026, issued by the Japanese Patent Office in corresponding application JP 2022-143828.

* cited by examiner

*Primary Examiner* — Russell Frejd

(74) *Attorney, Agent, or Firm* — Stein IP, LLC

(57) ABSTRACT

A side cover structure includes a main frame extending rearward from a head pipe, a seat rail positioned behind the main frame, a side cover fixed to the seat rail from an inner side in a vehicle width direction. Below a driver seating surface of a seat on the seat rail, the side cover is exposed, to an outer side in the vehicle width direction, from an opening formed by rail members included in the seat rail.

11 Claims, 5 Drawing Sheets

FIG. 4

SIDE COVER STRUCTURE

CROSS-REFERENCE TO RELATED APPLICATIONS

This application is based on and claims priority under 35 USC 119 from Japanese Patent Application No. 2022-143828 filed on Sep. 9, 2022, the entire content of which is incorporated herein by reference.

TECHNICAL FIELD

The present disclosure relates to a side cover structure.

BACKGROUND ART

In the related art, a structure is known in which a seat rail of a straddle-type vehicle is covered with a side cover from an outer side in a vehicle width direction (for example, see JPH07-137677A). Right and left main frames of the straddle-type vehicle described in JPH07-137677A pass above an engine and go around to the rear of the engine. The seat rails extend rearward from two places, spaced apart from each other in an upper-lower direction, of the rear portion of each of the main frames. A triangular opening having three sides of a rear portion of the main frame, the seat rail on an upper side, and the seat rail on the lower side is formed in a side surface of the straddle-type vehicle. A side cover is attached below a seat to cover the triangular opening from an outer side in the vehicle width direction.

In a case where the side cover is attached to the lower side of the seat, a problem tends to occur in a foot grounding property of a driver when the straddle-type vehicle is stopped. In addition, a gap between the seat rail and the side cover becomes large, and dust resistance decreases.

SUMMARY OF INVENTION

Aspect of non-limiting embodiments of the present disclosure relates to provide a side cover structure capable of improving a foot grounding property and dust resistance.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a side cover structure forming a side surface of a straddle-type vehicle, the side cover structure including: a main frame extending rearward from a head pipe; a seat rail positioned behind the main frame; and a side cover fixed to the seat rail from an inner side in a vehicle width direction, in which, below a driver seating surface of a seat on the seat rail, the side cover is exposed, to an outer side in the vehicle width direction, from an opening formed by rail members included in the seat rail.

BRIEF DESCRIPTION OF DRAWINGS

Exemplary embodiment(s) of the present invention will be described in detail based on the following figures, wherein:

FIG. 4 is a cross-sectional view of the straddle-type vehicle of FIG. 3 taken along a line IV-IV.

DESCRIPTION OF EMBODIMENTS

Figure 1:
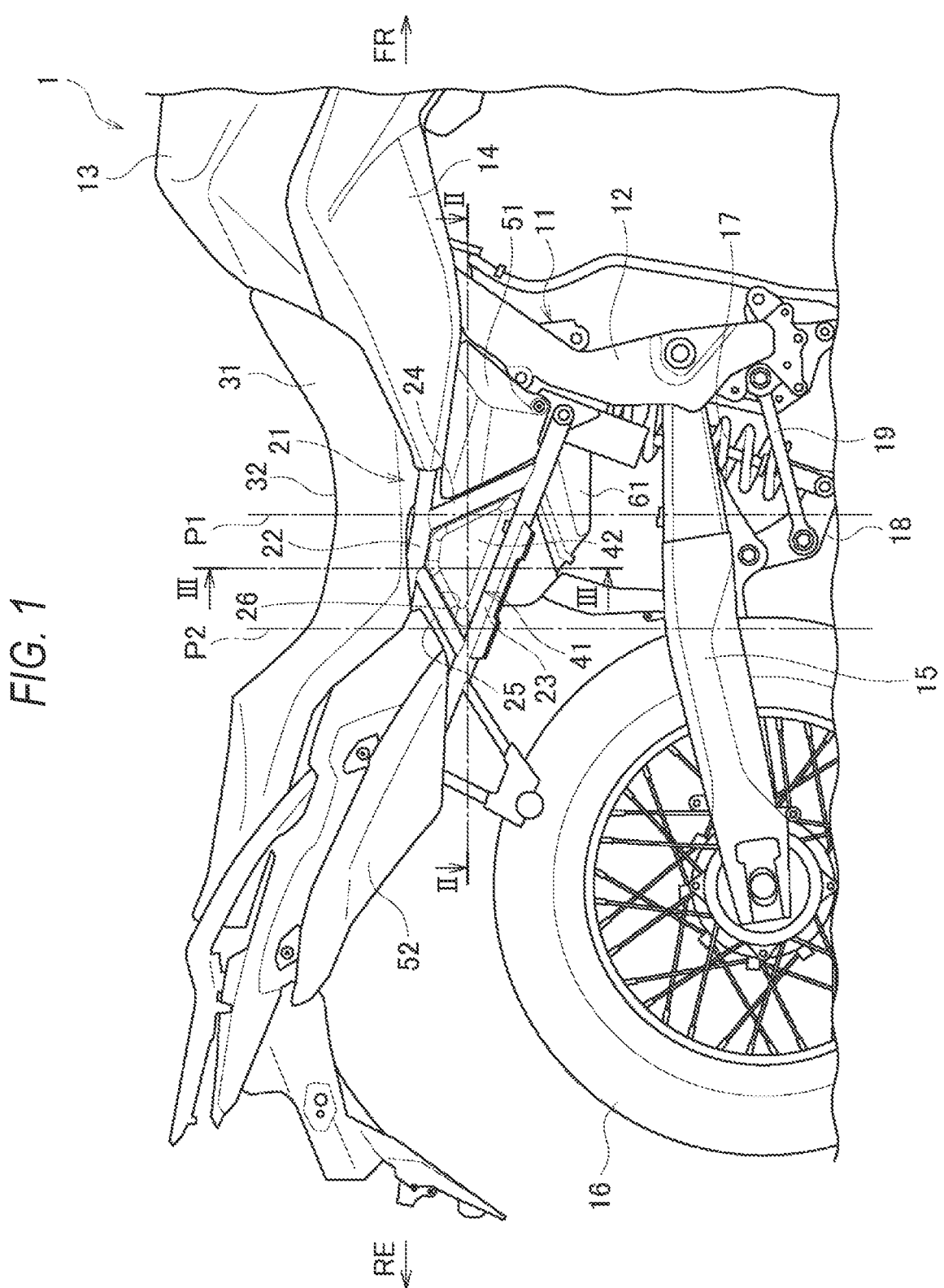
FIG. 1 is a right side view of a rear half portion of a straddle-type vehicle according to an exemplary embodiment of the present invention.

A side cover structure according to an aspect of the present disclosure forms a side surface of a straddle-type vehicle. In the side cover structure, a main frame extends rearward from a head pipe. A seat rail is positioned behind the main frame. The side cover is fixed to the seat rail from an inner side in a vehicle width direction. The side cover is exposed to an outer side in the vehicle width direction from an opening formed by rail members included in the seat rail, below a driver seating surface of a seat on the seat rail. Since the side cover is fixed to the seat rail from the inner side in the vehicle width direction, a vehicle width dimension below the driver seating surface of the seat can be reduced. Thus, the foot grounding property is improved in a case where the driver stands upright across the vehicle at the time of stop or the like. Since a gap between the seat rail and the side cover is positioned on the outer side of the side cover in the vehicle width direction, dust is less likely to enter the inner side of the side cover, and the dust resistance is improved.

Embodiment

In a general straddle-type vehicle, in a case where a pair of seat rails are covered with the side covers from the outer side in the vehicle width direction, the vehicle width dimension below the seat becomes large, and the foot grounding property of the driver deteriorates. In particular, in a case where an air cleaner of a horizontal type is disposed below the seat, the air cleaner is covered with the pair of side covers from the outer side in the vehicle width direction. Therefore, in order to ensure a capacity of the air cleaner, it is necessary to ensure a large distance between the pair of side covers. In a case where the driver stands upright across the seat at the time of stop or the like, the driver's feet are less likely to be attached to the ground due to bulging of the pair of side covers.

Since the gap between the seat rail and the side cover is formed on the inner side of the side cover, dust or the like easily enters the inner side of the side cover through the gap between the seat rail and the side cover. For this reason, it is necessary to adopt a structure in which a joint portion between the seat and the side cover is complicated. In order to reduce the vehicle width dimension or to prevent intrusion of dust or the like, a structure in which the pair of side covers are installed on the inner sides of the pair of seat rails in the vehicle width direction is also conceivable. However, since the distance between the pair of side covers becomes narrow, a space in a vicinity of an air intake port of the air cleaner cannot be sufficiently ensured, and the air intake efficiency of an engine may decrease.

As described above, by decreasing the distance between the pair of side covers, the foot grounding property and the dust resistance can be improved, but the air intake efficiency of the engine decreases. On the other hand, by increasing the distance between the pair of side covers, the air intake efficiency of the engine can be improved, but the foot grounding property and the dust resistance are reduced. In the straddle-type vehicle of the present embodiment, the pair of side covers are fixed to the pair of seat rails from the inner side in the vehicle width direction to improve the foot grounding property and the dust resistance, and the side covers are bulged outward from openings of the respective seat rails to ensure a space in the vicinity of the air intake port of the air cleaner and to prevent a decrease in the air intake efficiency of the engine.

Hereinafter, the straddle-type vehicle according to the present embodiment will be described with reference to the accompanying drawings. FIG. 1 is a right side view of a rear half portion of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a pair of main frames 11, which is branched to the left and right from an upper portion of a head pipe that is not shown, extend rearward. Front portions of the pair of main frames 11 are a pair of tank rails that is not shown. A fuel tank 13 is supported, at a vehicle front side, by the pair of tank rails. Rear portions of the pair of main frames 11 are a pair of body frames 12. Various components are supported, at a center of the vehicle, by the pair of body frames 12. A pair of tank rail covers 14 are attached to the pair of tank rails from the outer side in the vehicle width direction. The tank rails are covered by the pair of tank rail covers 14.

A swing arm 15 is swingably supported at lower half portions of the pair of body frames 12. The swing arm 15 extends rearward from the body frame 12. A rear wheel 16 is rotatably supported at a rear end of the swing arm 15. A front side of the swing arm 15 and a lower portion of a rear cushion 17 are connected via a cushion lever 18. An intermediate portion of the cushion lever 18 and the body frame 12 are connected via a cushion rod 19. Since the rear cushion 17 extends and contracts in accordance with the swing of the swing arm 15, unevenness of a road surface is absorbed, a vibration is prevented, and a ground contact performance between the road surface and the rear wheel 16 is enhanced.

A pair of seat rails 21 are attached to upper half portions of the pair of body frames 12. The pair of seat rails 21 are positioned behind the pair of main frames 11. A seat 31 is supported, at the center of the vehicle, by the pair of seat rails 21. Each seat rail 21 includes a plurality of pipe-like rail members such as an upper rail member 22, a lower rail member 23, and connecting rail members 24 and 25. The upper rail member 22 extends obliquely rearward and upward from an upper portion of the body frame 12. The lower rail member 23 extends obliquely rearward and upward from an intermediate portion of the body frame 12. A rear end portion of the lower rail member 23 is joined to a rear end portion of the upper rail member 22.

The upper rail member 22 and the lower rail member 23 are connected to each other via the connecting rail members 24 and 25, below a driver seating surface 32 of the seat 31 on the seat rail 21. Below the driver seating surface 32 of the seat 31, a pair of side covers 41 are fixed to the pair of seat rails 21 from the inner side in the vehicle width direction. A rear portion of an air cleaner 61 and a battery 66 (see FIG. 2) on a vehicle inner side are covered by the pair of side covers 41. The seat rail 21 is formed with an opening 26 having four sides of the upper rail member 22, the lower rail member 23, and the connecting rail members 24 and 25. The side cover 41 is exposed to the outer side in the vehicle width direction through the opening 26, thereby improving design.

A pair of front seat rail covers 51 are fixed to front sides of the pair of side covers 41. The air cleaner 61 on the vehicle inner side is covered by the pair of front seat rail covers 51. A pair of rear seat rail covers 52 are fixed to rear sides of the pair of side covers 41. The pair of seat rails 21 are covered by the pair of rear seat rail covers 52. Lower sides of the pair of side covers 41 are connected to each other via a rear fender 53. The pair of side covers 41 and the rear fender 53 (particularly see FIG. 4) form a concave luggage box below the seat 31.

Figure 2:
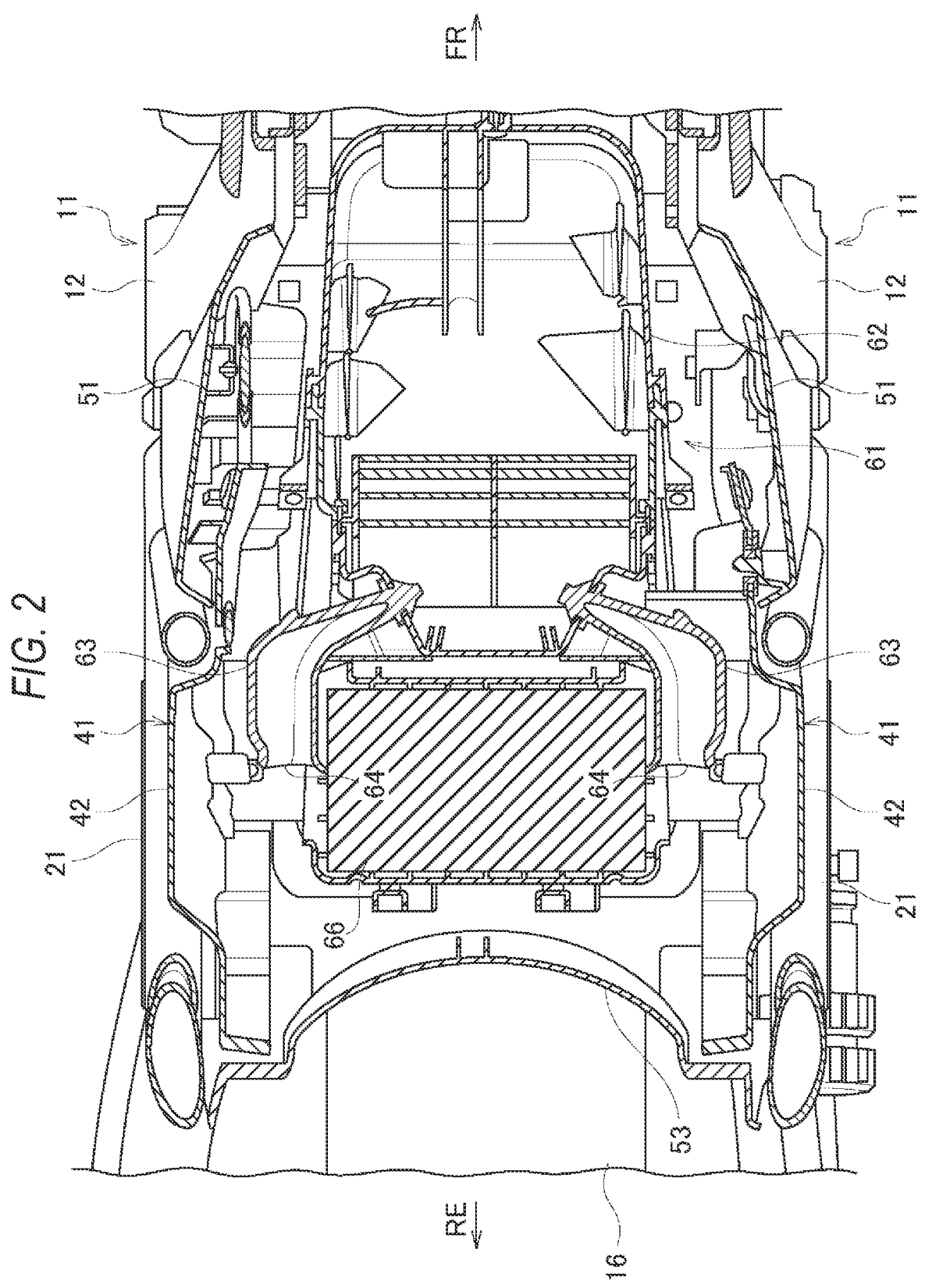
FIG. 2 is a cross-sectional view of the straddle-type vehicle of FIG. 1 taken along a line II-II.
Figure 3:
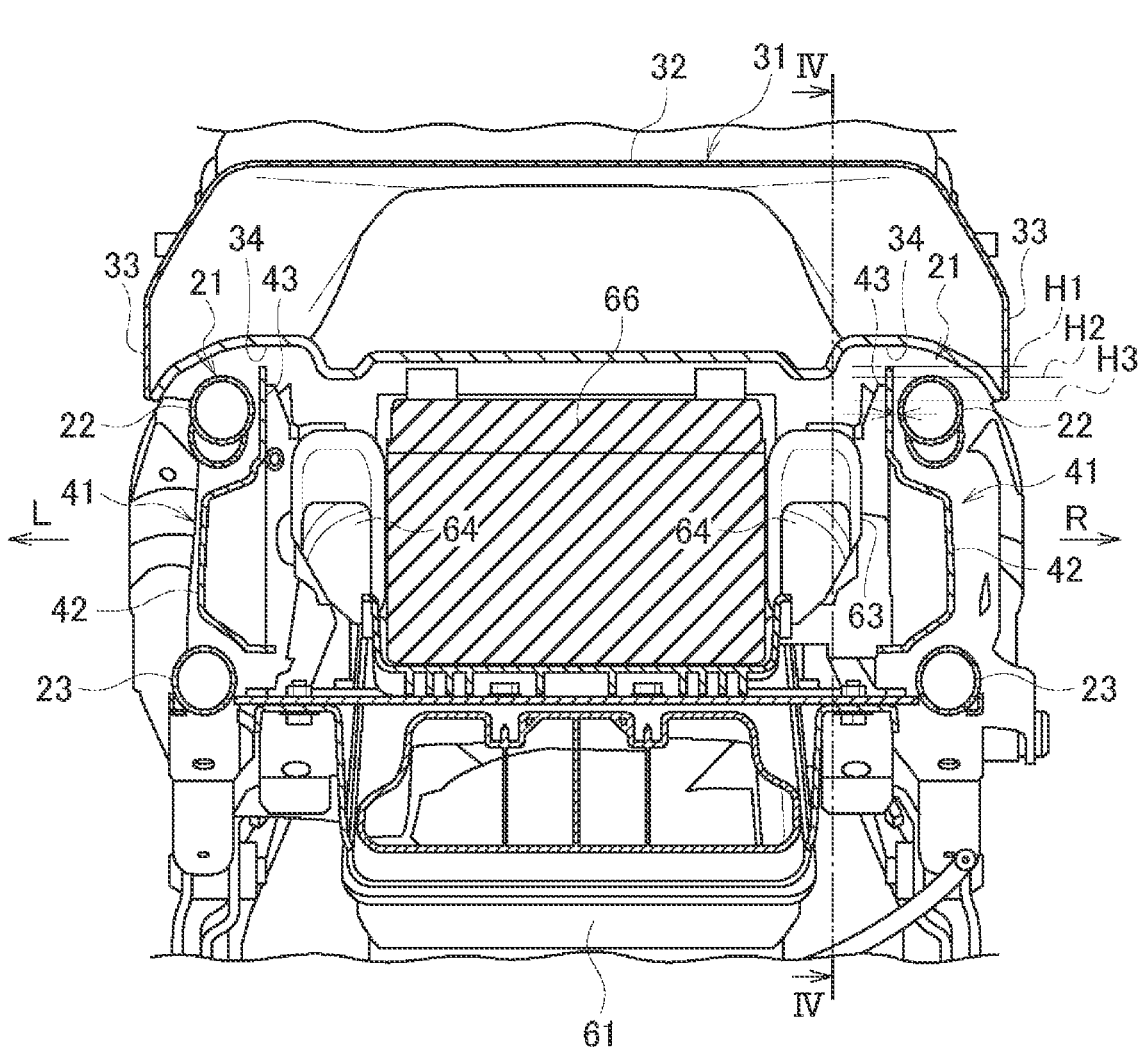
FIG. 3 is a cross-sectional view of the straddle-type vehicle of FIG. 1 taken along a line III-III.
Figure 4:
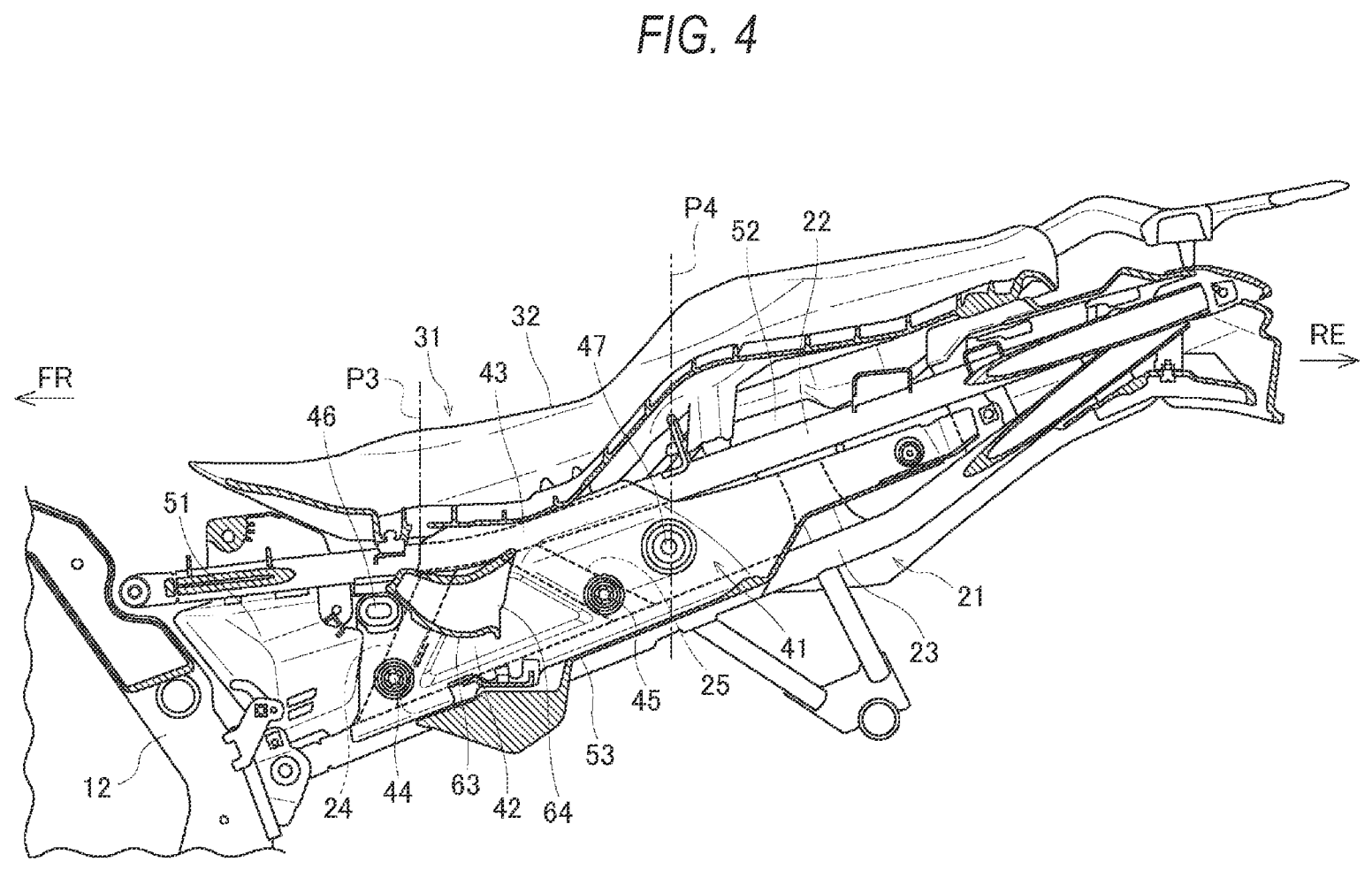
Figure 5:
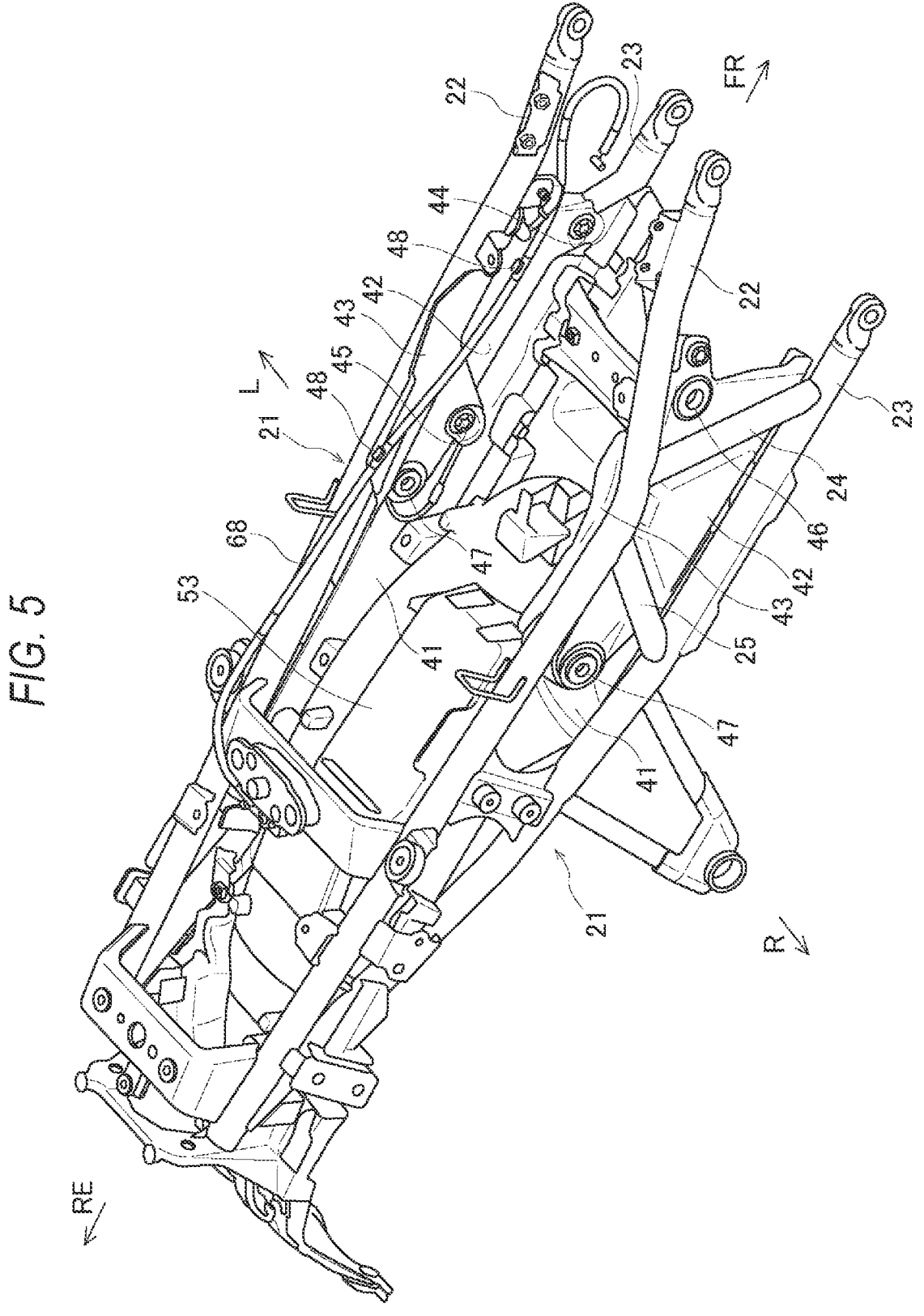
FIG. 5 is a perspective view of a side cover and a seat rail according to the present embodiment.

A detailed configuration of the side cover structure of the straddle-type vehicle will be described with reference to FIGS. 1 to 5. FIG. 2 is a cross-sectional view of the straddle-type vehicle of FIG. 1 taken along a line II-II. FIG. 3 is a cross-sectional view of the straddle-type vehicle of FIG. 1 taken along a line FIG. 4 is a cross-sectional view of the straddle-type vehicle of FIG. 3 taken along a line IV-IV. FIG. 5 is a perspective view of a side cover and a seat rail according to the present embodiment.

As shown in FIG. 1, a side surface of a straddle-type vehicle 1 is formed by the side cover structure including the main frame 11, the seat rail 21, the side cover 41, and the like. The driver seating surface 32 of the seat 31 is recessed in an arc shape, in a side view. In the straddle-type vehicle 1 as in the present embodiment, a seating position of a driver is often positioned between a lowest position P1 and a rear end position P2 of the driver seating surface 32. Thus, a leg portion in a case where the driver stands upright across the driver seating surface 32 is easily positioned between the lowest position P1 and the rear end position P2. Therefore, between the lowest position P1 and the rear end position P2 of the driver seating surface 32, the side cover 41 is positioned on the inner side, in the vehicle width direction, of the seat rail 21.

Between the lowest position P1 and the rear end position P2 of the driver seating surface 32, a vehicle width dimension of the straddle-type vehicle 1 is reduced, and the foot grounding property of the driver at the time of stopping or the like is improved. The opening 26 of the seat rail 21 is positioned between the lowest position P1 and the rear end position P2 of the driver seating surface 32. As described above, the side cover 41 is exposed from the opening 26 of the seat rail 21, and an exposed portion of the side cover 41 bulges outward in the vehicle width direction to enter the opening 26 of the seat rail 21. An internal space at the center of the vehicle is widened due to a bulging portion 42 of the side cover 41, and the bulging portion 42 of the side cover 41 is characterized in that the design is improved.

The front seat rail cover 51 is positioned forward than the lowest position P1 of the driver seating surface 32. The front seat rail cover 51 fills a space between the main frame 11 and the seat rail 21 in front of the side cover 41. Similarly to the side cover 41, the front seat rail cover 51 bulges outward in the vehicle width direction, and the internal space at the center of the vehicle is widened. The rear seat rail cover 52 is positioned rearward than the rear end position P2 of the driver seating surface 32. The rear seat rail cover 52 is fixed to the seat rail 21 from the outer side in the vehicle width direction, thereby ensuring a wide internal space in a vehicle rear portion.

As shown in FIG. 2, the air cleaner 61 of a horizontal type is disposed inside the pair of front seat rail covers 51, in the vehicle width direction. A pair of air intake pipes 63 extend rearward from a rear portion of a cleaner case 62 of the air cleaner 61. The pair of air intake pipes 63 are positioned inside the pair of side covers 41, in the vehicle width direction. The pair of air intake pipes 63 are curved to open to the left and right toward the rear. The battery 66 is disposed between the pair of air intake pipes 63. An air intake port 64 of the air cleaner 61 is positioned on the inner side, in the vehicle width direction, of the bulging portion 42 of the side cover 41. A space around the air intake port 64 is widened to improve the air intake efficiency, air easily flows into the air intake port 64, and an air intake noise is reduced.

As shown in FIG. 3, since the pair of side covers 41 are fixed to the pair of seat rails 21 from the inner side in the vehicle width direction, a gap between each of the seat rails 21 and the corresponding side cover 41 is positioned on the outer side, in the vehicle width direction, of the side cover 41. Therefore, even in a case where the gap is formed between the seat rail 21 and the side cover 41, dust, muddy water, or the like is less likely to enter the inner side of the side cover 41. The seat 31 is positioned above the seat rails 21 and the side covers 41. Since the seat 31 protrudes outward, in the vehicle width direction, than the side covers 41 in an eaves shape, dust or the like from above are less likely to enter the inner side of the side cover 41.

A part of an upper edge of the side cover 41 expands upward to form an expansion portion 43. The seat rail 21 (the upper rail member 22) overlaps the expansion portion 43 of the side cover 41 from the outer side in the vehicle width direction, below the driver seating surface 32 of the seat 31. An intrusion path of dust or the like toward the upper side of the expansion portion 43 is narrowed by the seat rail 21, and it is difficult for dust or the like to intrude into the inner side of the side cover 41. The expansion portion 43 expands upward from the seat rail 21. The height H1 of an upper edge of the expansion portion 43 is higher than the height H2 of an upper edge of the upper rail member 22. Therefore, even in a case where dust or the like adheres to the seat rail 21, the dust or the like is less likely to enter the inner side of the side cover 41 beyond the expansion portion 43.

Each expansion portion 43 is positioned on an inner side, in the vehicle width direction, than a seat side edge 33. The upper edge of the expansion portion 43 is covered with the seat side edge 33 from the outer side in the vehicle width direction. That is, the height H3 of a lower edge of the seat side edge 33 is smaller than the height H1 of the upper edge of the expansion portion 43. Although there is a gap between the upper edge of the expansion portion 43 and a seat bottom surface 34, the seat side edge 33 makes it difficult for dust or the like to flow inward in the vehicle width direction, and makes it difficult for dust or the like to enter the inner side of the side cover 41. Each air intake port 64 is positioned on the inner side, in the vehicle width direction, of the side cover 41. Thus, dust or the like is less likely to enter the inner side of the side cover 41, thereby preventing dust or the like from entering the air intake port 64.

As shown in FIGS. 4 and 5, the side cover 41 extends along the seat rail 21. The side cover 41 is fixed, from the inner side, to the connecting rail members 24 and 25 of the seat rail 21 by fastening bolts 44 and 45. The front seat rail cover 51 is attached to an attachment portion 46 on a front side of the side cover 41. The rear seat rail cover 52 is attached to an attachment portion 47 on a rear side of the side cover 41. The rear fender 53 is attached to lower edges of the side covers 41 along the lower edges. A method of attaching the various covers and the cowl is not particularly limited, and attachment methods such as screwing, hooking, and clipping are appropriately used.

The expansion portion 43 of the side cover 41 extends, in the front-rear direction, from a vicinity of the attachment portion 46 of the front seat rail cover 51 to a vicinity of the attachment portion 47 of the rear seat rail cover 52, below the driver seating surface 32 of the seat 31. Between the front seat rail cover 51 and the rear seat rail cover 52, the expansion portion 43 is positioned above the air intake port 64 of the air intake pipe 63. A front end position P3 of the expansion portion 43 is positioned in front of the air intake port 64. A rear end position P4 of the expansion portion 43 is positioned behind the air intake port 64. By expanding and forming the expansion portion 43 forward and backward with respect to the air intake port 64, dust or the like is prevented from flying into the air intake port 64 on the inner side of the side cover 41.

A holding portion 48 of a seat lock wire (wire member) 68 is formed on the inner surface of the side cover 41 on a left side. Thus, the side cover 41 is provided with a function of holding the seat lock wire 68, thereby reducing cost. A harness (not shown) is disposed inside the pair of side covers 41, and the harness is protected by the side covers 41. In addition, since the pair of side covers 41 are separated from each other, a degree of freedom in designing the side covers 41 in a mold releasing direction is increased. Accordingly, the bulging portion 42, the holding portion 48, and the like are easily formed on each side cover 41, and the design is improved by unevenness formed on the surface of each side cover 41.

As described above, according to the side cover structure of the present embodiment, since the pair of side covers 41 are fixed to the inner sides of the pair of seat rails 21, the vehicle width dimension below the driver seating surface 32 of the seat 31 can be reduced. For this reason, in a case where the driver stands upright across the vehicle at the time of stop or the like, the foot grounding property is improved. Since the gap between the seat rail 21 and the side cover 41 is positioned on the outer side of the side cover 41 in the vehicle width direction, dust is less likely to enter the inner side of the side cover 41 in the vehicle width direction, and the dust resistance is improved.

A shape of the pair of seat rails is not particularly limited, and the pair of seat rails may be formed to be able to support the seat on the rear sides of the main frames.

A shape of the pair of side covers is not particularly limited as long as the pair of side covers may be formed to be fixed to the pair of seat rails from the inner side.

In the present embodiment, the pair of side covers are provided in the straddle-type vehicle, but only one of the left and right side covers may be provided in the straddle-type vehicle.

The pair of side covers are separated from each other in the present embodiment, but the pair of side covers may be integrally formed with the rear fender or the like.

Further, in the present embodiment, the wire member is not limited to the seat lock wire, and the wire member may be installed on the vehicle inner side.

The side cover structure of the present embodiment is not limited to the motorcycle described above, and may be adopted in other straddle-type vehicles. The straddle-type vehicle is not limited to a general vehicle in which a driver rides on a seat in a posture straddling the seat, and includes a scooter-type vehicle in which the driver rides on the seat without straddling the seat.

As described above, according to a first aspect, there is provided a side cover structure forming a side surface of a straddle-type vehicle (1), and the side cover structure includes a main frame (11) extending rearward from a head pipe, a seat rail (21) positioned behind the main frame, and a side cover (41) fixed to the seat rail from an inner side in a vehicle width direction. Below a driver seating surface (32) of a seat (31) on the seat rail, the side cover is exposed, to an outer side in the vehicle width direction, from an opening formed by rail members included in the seat rail. According to this configuration, since the side cover is fixed to the inner side of the seat rail, a vehicle width dimension below the driver seating surface of the seat can be reduced. For this reason, in a case where the driver stands upright across the vehicle at the time of stop or the like, the foot grounding property is improved. Since the gap between the seat rail and the side cover is positioned on an outer side, in the vehicle width direction, of the side cover, dust is less likely to enter the inner side of the side cover in the vehicle width direction, and the dust resistance is improved.

According to a second aspect, in the first aspect, a part of an upper edge of the side cover is expanded upward to form an expansion portion (43), and below the driver seating surface of the seat, the seat rail overlaps the expansion portion from the outer side in the vehicle width direction. According to this configuration, dust, muddy water, or the like are prevented from entering the inner side of the side cover by the seat rail.

According to a third aspect, in the second aspect, the expansion portion expands upward than the seat rail. According to this configuration, dust, muddy water, or the like adhering to the seat rail is prevented from entering the inner side of the side cover over the expansion portion.

According to a fourth aspect, in any one of the first aspect to the third aspect, a part of the upper edge of the side cover is expanded upward to form the expansion portion, and below the driver seating surface of the seat, the expansion portion is positioned on the inner side in the vehicle width direction than a seat side edge (33), and the expansion portion is covered with the seat side edge from the outer side in the vehicle width direction. According to this configuration, dust, muddy water, or the like are prevented from entering the inner side of the side cover by the seat side edge.

According to a fifth aspect, in any one of the first aspect to the fourth aspect, an air cleaner (61) is disposed on an inner side, in the vehicle width direction, of the seat rail, a part of the upper edge of the side cover is expanded upward to form the expansion portion, and below the driver seating surface of the seat, the expansion portion is positioned above an air intake port (64) of the air cleaner, a front end of the expansion portion is positioned in front of the air intake port, and a rear end of the expansion portion is positioned behind the air intake port. According to this configuration, dust, muddy water, or the like is prevented from flying into the air intake port on the inner side of the side cover by expanding and forming the expansion portion forward and backward with respect to the air intake port.

According to a sixth aspect, in any one of the first aspect to the fifth aspect, an exposed portion of the side cover bulges outward, to enter the opening, in the vehicle width direction to form a bulging portion, the exposed portion being exposed from the opening. According to this configuration, a space inside the side cover in the vehicle width direction can be enlarged. The exposed portion of the side cover is characterized in that the design is improved.

According to a seventh aspect, in the sixth aspect, an air cleaner is disposed on an inner side, in the vehicle width direction, of the seat rail, and an air intake port of the air cleaner is positioned on an inner side, in the vehicle width direction, of the bulging portion. According to this configuration, the air intake efficiency can be improved by ensuring a wide space around the air intake port. In addition, air easily flows into the air intake port, and an air intake noise can be reduced.

According to an eighth aspect, in any one of the first aspect to the seventh aspect, the side cover is a pair of side covers separated to the left and right. According to this configuration, since the pair of side covers are separate bodies, a degree of freedom in designing the side covers in a mold releasing direction can be increased, and the design of the side cover can be improved.

According to a ninth aspect, in any one of the first aspect to the eighth aspect, a holding portion (48) of a wire member (seat lock wire 68) is formed on an inner surface of the side cover. According to this configuration, it is possible to reduce cost by providing the side cover with a function of holding the wire member.

Although the present embodiment has been described, other embodiments may be used in which the above embodiment and modification are combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A side cover structure forming a side surface of a straddle-type vehicle, the side cover structure comprising:
   a main frame extending rearward from a head pipe;
   a seat rail positioned behind the main frame; and
   a side cover fixed to the seat rail from an inner side in a vehicle width direction,
   wherein, below a driver seating surface of a seat on the seat rail, the side cover is exposed, to an outer side in the vehicle width direction, from an opening formed by rail members included in the seat rail, and
   wherein a part of an upper edge of the side cover is expanded further upward than a height of the upper edge of an upper rail member of the seat rail to form an expansion portion.

2. The side cover structure according to claim 1,
   wherein, below the driver seating surface of the seat, the seat rail overlaps the expansion portion from the outer side in the vehicle width direction.

3. The side cover structure according to claim 1,
   wherein, below the driver seating surface of the seat, the expansion portion is positioned on the inner side in the vehicle width direction than a seat side edge, and the expansion portion is covered with the seat side edge from the outer side in the vehicle width direction.

4. The side cover structure according to claim 1,
   wherein an air cleaner is disposed on an inner side, in the vehicle width direction, of the seat rail,
   wherein, below the driver seating surface of the seat, the expansion portion is positioned above an air intake port of the air cleaner, a front end of the expansion portion is positioned in front of the air intake port, and a rear end of the expansion portion is positioned behind the air intake port.

5. The side cover structure according to claim 1, wherein an exposed portion of the side cover bulges outward, to enter the opening, in the vehicle width direction to form a bulging portion, the exposed portion being exposed from the opening.

6. The side cover structure according to claim 5, wherein an air cleaner is disposed on an inner side, in the vehicle width direction, of the seat rail, and wherein an air intake port of the air cleaner is positioned on an inner side, in the vehicle width direction, of the bulging portion.

7. The side cover structure according to claim 1, wherein the side cover is a pair of side covers separated to the left and right.

8. The side cover structure according to claim 1, wherein a holding portion of a wire member is formed on an inner surface of the side cover.

9. The side cover structure according to claim 1, wherein the rail members include an upper rail member, a lower rail member, and connecting rail members that connect the upper rail member and the lower rail member, wherein the seat rail is formed with an opening defined by the upper rail member, the lower rail member, and the connecting rail members, wherein the side cover is exposed to the outer side in the vehicle width direction through the opening, wherein the side cover extends in a vehicle front-rear direction along the upper rail member and the lower rail member, wherein the side cover overlaps respective connecting rail members provided at a front and a rear of the side cover, and wherein the side cover is fixed, from the inner side to the connecting rail members.

10. The side cover structure according to claim 1, wherein a front seat rail cover is attached to a front attachment portion of the side cover, and a rear seat rail cover is attached to a rear attachment portion of the side cover.

11. The side cover structure according to claim 1, wherein a rear fender is attached to lower edge of the side cover along the lower edge.

\* \* \* \* \*